United States Patent
Tiwari et al.

(10) Patent No.: US 12,543,101 B2
(45) Date of Patent: Feb. 3, 2026

(54) METHOD AND SYSTEM FOR HANDLING UE WITH CAG SUBSCRIPTION IN WIRELESS NETWORK

(71) Applicant: SAMSUNG ELECTRONICS CO., LTD., Suwon-si (KR)

(72) Inventors: Kundan Tiwari, Bangalore (IN); Varini Gupta, Bangalore (IN); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 483 days.

(21) Appl. No.: 17/999,540

(22) PCT Filed: May 20, 2021

(86) PCT No.: PCT/KR2021/006299
§ 371 (c)(1),
(2) Date: Nov. 21, 2022

(87) PCT Pub. No.: WO2021/235875
PCT Pub. Date: Nov. 25, 2021

(65) Prior Publication Data
US 2023/0209441 A1 Jun. 29, 2023

(30) Foreign Application Priority Data
May 21, 2020 (IN) .............................. 202041021491
May 17, 2021 (IN) .............................. 202041021491

(51) Int. Cl.
*H04W 48/02* (2009.01)
*H04W 60/06* (2009.01)

(52) U.S. Cl.
CPC ........... *H04W 48/02* (2013.01); *H04W 60/06* (2013.01)

(58) Field of Classification Search
CPC ..... H04W 48/02; H04W 60/06; H04W 8/186; H04W 60/00
See application file for complete search history.

(56) References Cited

U.S. PATENT DOCUMENTS

2020/0314731 A1* 10/2020 Ryu ..................... H04W 64/003
2021/0314848 A1* 10/2021 Tiwari .................. H04W 48/02
(Continued)

FOREIGN PATENT DOCUMENTS

CN   110536293 A   12/2019
WO   2020092742 A1  5/2020

OTHER PUBLICATIONS

International Search Report and Written Opinion of the International Searching Authority dated Aug. 25, 2021, in connection with International Application No. PCT/KR2021/006299, 7 pages.
(Continued)

*Primary Examiner* — Mazda Sabouri (57) ABSTRACT

The present disclosure discloses method and apparatus for handling a user equipment (UE) (100) with a closed access group (CAG) subscription in a wireless network by a first network device (200). The method comprises receiving a registration request from the UE (100); and transmitting, a first message to a second network device (300), in response to receiving the registration request, wherein the first message indicates a request to register with the second network device (300) on behalf of the UE (100), and whether the first network device (200) supports CAG feature.

14 Claims, 5 Drawing Sheets

(56) References Cited

U.S. PATENT DOCUMENTS

| | | | | |
|---|---|---|---|---|
| 2022/0201482 A1* | 6/2022 | Ferdi | .................... | H04L 9/3236 |
| 2022/0225098 A1* | 7/2022 | Guo | .................... | H04W 12/76 |
| 2022/0353799 A1* | 11/2022 | Talebi Fard | .......... | H04W 48/16 |

OTHER PUBLICATIONS

Ericsson, "Updating the UE with new CAG information", S2-2002585, 3GPP TSG-SA WG2 Meeting #137E, 28 pages.

Samsung, "Handling of a CAG UE at non supporting AMF", C1-202364, 3GPP TSG-CT1 Meeting #123-e, 18 pages.

Ericsson et al., "Updating the UE with new CAG information", S2-2002843, 3GPP TSG-SA WG2 Meeting #138E, 4 pages.

Intellectual Property India, "Examination report under sections 12&13 of the Patents Act" dated Feb. 22, 2022, in connection with Indian Patent Application No. 202041021491, 5 pages.

"SRIB—Sending CAG capability negotiation between NFs" Jun. 19, 2020, 8 pages.

\* cited by examiner

METHOD AND SYSTEM FOR HANDLING UE WITH CAG SUBSCRIPTION IN WIRELESS NETWORK

CROSS-REFERENCE TO RELATED APPLICATIONS

This application is a 371 of International Application No. PCT/KR2021/006299 filed May 20, 2021, which claims priority to Indian Patent Application No. 202041021491, filed May 21, 2020, and Indian Patent Application No. 202041021491, filed May 17, 2021, the disclosures of which are herein incorporated by reference in their entirety.

BACKGROUND

1. Field

The present disclosure relates to wireless communication, and more specifically to a method and a system for handling a User Equipment (UE) with a Closed Access Group (CAG) subscription in a wireless network.

2. Description of Related Art

A Public Network Integrated Non-Public Network (PNI-NPN) is a Non-Public Network (NPN) that is made accessible via Public Land Mobile Networks (PLMNs) by means of a dedicated Data Network Name (DNN), or one (or more) network slices allocated for the NPN. When the PNTI-NPN is made available via the PLMN, then a User Equipment (IE) shall have a subscription for the PLMN in order to access the PNI-NPN. A CAG feature is used for controlling and preventing the UE from trying to access the PLMN in areas where the UE is not allowed to use the network slices allocated for the PNI-NPN. The CAG feature is used to identify a group of subscribers who are permitted to access one or more CAG cells. The CAG cells shall broadcast information such that only UEs supporting the CAG feature are accessing these cells.

In a heterogeneous deployment scenario, Network Functions (NF) such as a Base Station (BS), an Access and Mobility Management Function (AMF) in some areas are only supporting the CAG feature. When the UE has a Universal Subscriber Identity Module (USIM) with a CAG subscription, then the UE is allowed to access a Fifth Generation System (5GS) via a CAG cell only i.e. the UE is not allowed to access the 5GS via a non-GAG cell. The non-CAG cell is a public PLMN normal cell where the UE can access a public PLMN service.

Initially, the UE has to configure for enabling the UP to access the 5GS via the CAG cell. In an example scenario, a brand new UE contains the USIM with the CAG subscription is not configured to access the 5GS via the CAG cell. In another example scenario, a subscription of the USIM may change from the CAG and non-CAG subscriptions to the CAG subscription, but the configuration in the UE may not be updated by the 5GS.

In both scenarios, the UE initiates a registration procedure by sending a sends a registration request message to the AMF through the non-CAG cell instead of the GAG cell due to not updating/having the configuration. The AMF associated with the non-CAG cell does not support the CAG feature. When the AMF receives the registration request message, the AMF requests a Unified Data Management (UDM) to send subscription information of the UE. The UDM sends the subscription information of the UTE containing CAG information indicating that the UE is allowed to access the 5GS via the CAG cell only. The AMF will not understand the CAG information and accept the registration procedure, but in principle, the AMF should have rejected the registration procedure. Due to accepting the registration procedure, the UE keeps attached to the AMF via the non-CAG cell. But, the UE will not get a service associated with the CAG subscription on the non-CAG cell and keeps attached to the AMF that does not support the CAG feature.

Consider, another example scenario in which the UE contains the USIM with the CAG and non-CAG subscriptions and the UE attaches to a network through the AMF that does not support the CAG feature. As per the CAG and non-CAG subscriptions, the UE is allowed to access the 5GS via the CAG cell and the non-CAG cell. Consider, the CAG and non-CAG subscriptions of the USIM is changed to the CAG subscription only. The UE is now allowed to access the 5GS via the CAG cell only. In response to detecting the change in the subscription of the USIM, the UDM sends the subscription information of the UE containing the CAG information indicating that the UE is allowed to access the 5GS via the CAG cell only. Since the AMF does not support the CAG feature, the UE keeps attached to the AMF via the non-CAG cell. Further, the UE will not get the service associated with the CAG subscription on the non-CAG cell and keeps attached to the AMF that does not support the CAG feature. Thus, it is desired to address the above-mentioned shortcomings or at least provide a useful alternative.

SUMMARY

The principal object of the embodiments herein is to provide a method and a system for handling a UE with a CAG subscription in a wireless network. The system determines whether a first AMF supports CAG feature to provide services to the UE with the CAG subscription. In response to determining that the first AMF does not support the CAG feature, the system configures the UE to leave the first AMF. In this way, the UE can finally find a second AMF that supports the CAG feature. Further, the UE can initiate a connection with the second AMF and obtains necessary services from the second AMF, which improves a user experience in accessing the services.

Accordingly, the embodiments herein provide a method for handling a UE with a CAG subscription in a wireless network. The method includes receiving, by a first network device, a registration request from the UE. The method includes sending, by the first network device, a first message to a second network device, where the first message indicates a request to register with the second network device on behalf of the UE, and whether the first network device supports CAG feature. The method includes determining, by the second network device, whether the first network device supports the CAG feature based on the indication. The method includes determining, by the second network device, that the UE has the CAG subscription based on CAG subscription data. The method includes rejecting, by the second network device, the registration of the UE in first network device, in response to determining that the first network device does not support the CAG feature and the UE has the CAG subscription. The method includes sending, by the second network device, a second message indicating the rejection of the registration of the UE to the first network device.

In an embodiment, where the method includes sending, by the first network device, a registration reject message with a Non-Access Stratum (NAS) cause value to the LIE, in response to receiving the second message, and terminating, by the UE, an access to the first network device based on the NAS cause value, in response to receiving the registration reject message.

In an embodiment, where the NAS cause value comprises one of #3 (Illegal UE), #6 (Illegal Mobile Equipment (ME), #7 (Fifth Generation System (5GS) services not allowed), #11 (Public Land Mobile Network (PLMN) not allowed), #12 (Tracking area not allowed), #13 (Roaming not allowed in this tracking area), #15 (No suitable cells in tracking area), #27 (N1 mode not allowed), #62 (No network slices available), and #76 (Not authorized for this CAG or authorized for CAG cells only).

Accordingly, the embodiments herein provide a method for handling the UE with the (CAG subscription in the wireless network. The method includes detecting, by the second network device, a change in a subscription of the IE with respect to the CAG subscription data, where the IE is registered to the second network device through the first network device. The method includes determining, by the second network device, whether the first network device supports the CAG feature. The method includes sending, by the second network device, a message request to the first network device for initiating deregistration of the UE, in response to determining that the first network device does not support the CAG feature and the UE has the CAG subscription.

In an embodiment, where the method includes sending, by the first network device, a deregistration request message with the NAS cause value to the UE, in response to receiving the message request. The method includes initiating, by the UE, the deregistration of the UE at the first network device based on the NAS cause value, in response to receiving the deregistration request message.

The embodiments herein provide a method for handling a UE with a CAG subscription in a wireless network by a first network device (200). The method includes receiving a registration request from the UE (100); and transmitting, a first message to a second network device (300), in response to receiving the registration request, wherein the first message indicates a request to register with the second network device (300) on behalf of the UE (100), and whether the first network device (200) supports CAG feature.

The embodiments herein provide a method for handling the UE with the CAG subscription in the wireless network by a second network device (300). The method includes detecting a change in a subscription of the UE (100) with respect to CAG subscription data, wherein the UE (100) is registered to the second network device (300) through a first network device (200); determining whether the first network device (200) supports CAG feature; and transmitting, a message request to the first network device (200) for initiating a deregistration of the UE (100), in response to determining that the first network device (200) does not support the CAG feature and the UE (100) has the CAG subscription.

The embodiments herein provide an apparatus of a first network device (200) for handling the UE with the CAG subscription in the wireless network. The first network device (200) comprising: at least one processor coupled to the transceiver, wherein the at least one processor is configured: to receive a registration request from the UE (100) in a wireless network, and transmit a first message to the second network device (300), in response to receiving the registration request, wherein the first message indicates a request to register with the second network device (300) on behalf of the UE (100), and whether the first network device (200) supports CAG feature, The embodiments herein provide an apparatus of a second network device (300) for handling the UE with the (AG subscription in the wireless network. The second network device (300) comprising: a transceiver; and at least one processor coupled to the transceiver, wherein the at least one processor is configured: detect a change in a subscription of the UE (100) with respect to CAG subscription data, wherein the UE (100) is registered to the second network device (300) through the first network device (200), determine whether the first network device (200) supports CAG feature, and transmit a message request to the first network device (200) for initiating a deregistration of the UE (100), in response to determining that the first network device (200) does not support the CAG feature and the UE (100) has the CAG subscription.

Accordingly, the embodiments herein provide a system for handling the UE with the CAG subscription in the wireless network. The system includes the UE, the second network device, and the first network device. The first network device is configured for receiving the registration request from the UE in the wireless network. The first network device is configured for sending the first message to the second network device, where the first message indicates the request to register with the second network device on behalf of the UE, and whether the first network device supports the CAG feature. The second network device is configured for determining whether the first network device supports the CAG feature based on the indication. The second network device is configured for determining that the IE has the CAG subscription based on the CAG subscription data. The second network device is configured for rejecting the registration of the UE in first network device, in response to determining that the first network device does not support the CAG feature and the UE has the CAG subscription. The second network device is configured for sending the second message indicating the rejection of the registration of the UE to the first network device.

Accordingly, the embodiments herein provide the system for handling the UE with the CAG subscription in the wireless network. The system includes the UE, the second network device, and the first network device. The second network device is configured for detecting the change in the subscription of the UE with respect to the CAG subscription data, where the UE is registered to the second network device through the first network device. The second network device is configured for determining whether the first network device supports the CAG feature. The second network device is configured for sending the message request to the first network device for initiating the deregistration of the UE, in response to determining that the first network device does not support the CAG feature and the UE has the CAG subscription.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for handling a UE with a CAG subscription in a wireless network. The method includes receiving, by a first network device, a registration request from the UE. The method includes sending, by the first network device, a first message to a second network device, where the first message indicates a request to register with the second network device on behalf of the UE, and whether the first network device supports CAG feature. The method includes determining, by the second network device, whether the first network device supports the CAG feature based on the indication. The method includes determining, by the second network device, that the UE has the CAG subscription based on CAG subscription data. The method includes rejecting, by the second network device, registration of the UE to first network device, in response to determining that the first network device does not support the CAG feature and the UE has the CAG subscription. The method includes sending, by the second network device, a second message indicating the rejection of the registration of the UE to the first network device.

Accordingly, the embodiments herein provide a method for handling the IE with the CAG subscription in the wireless network. The method includes detecting, by the second network device, a change in a subscription of the UE with respect to the CAG subscription data, where the UE is registered to the second network device through the first network device. The method includes determining, by the second network device, whether the first network device supports the CAG feature. The method includes sending, by the second network device, a message request to the first network device for initiating a deregistration of the UE, in response to determining that the first network device does not support the CAG feature and the UE has the CAG subscription.

Accordingly, the embodiments herein provide a system for handling the UE with the CAG subscription in the wireless network. The system includes the UE, the second network device, and the first network device. The first network device is configured for receiving the registration request from the UE in the wireless network. The first network device is configured for sending the first message to the second network device, where the first message indicates the request to register with the second network device on behalf of the UE, and whether the first network device supports the CAG feature. The second network device is configured for determining whether the first network device supports the CAG feature based on the indication. The second network device is configured for determining that the UE has the CA G subscription based on the CAG subscription data. The second network device is configured for rejecting the registration of the UE to first network device, in response to determining that the first network device does not support the CAG feature and the UE has the CAG subscription. The second network device is configured for sending the second message indicating the rejection of the registration of the UE to the first network device.

Accordingly, the embodiments herein provide the system for handling the UE with the CAG subscription in the wireless network. The system includes the UE, the second network device and the first network device. The second network device is configured for detecting the change in the subscription of the UE with respect to the CAG subscription data, where the UE is registered to the second network device through the first network device. The second network device is configured for determining whether the first network device supports the CAG feature. The second network device is configured for sending the message request to the first network device for initiating the deregistration of the UE, in response to determining that the first network device does not support the CAG feature and the UE has the CAG subscription.

Unlike existing methods and systems, the proposed system determines whether a first AMF (i.e. first network device) supports the CAG feature to provide services to the UE with the CAG subscription. In response to determining that the first AMF does not support the CAG feature, the system configures the UE to leave the first AMF. In this way, the UE can finally find a second AMF that supports the CAG feature. Further, the UE can initiate the connection with the second AMP and obtains necessary services from the second AMF, which improves a user experience in accessing the services.

Referring now to the drawings, and more particularly to FIGS. 1 through 5, there are shown preferred embodiments.

Figure 1:
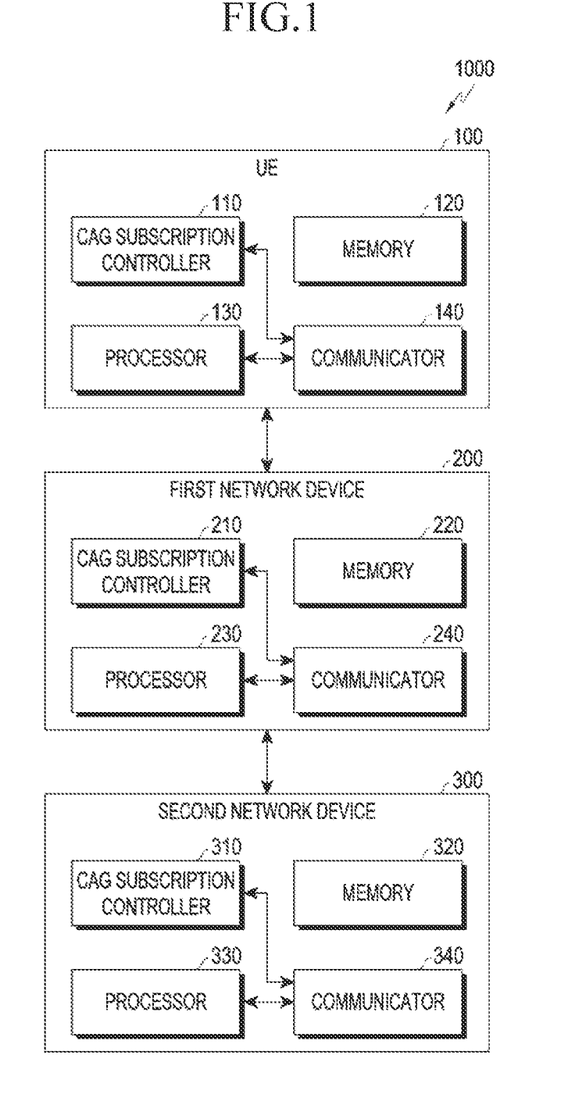
FIG. 1 illustrates a block diagram of a system for handling a UE with a CAG subscription in a wireless network according to various embodiments of the present disclosure.

FIG. 1 illustrates a block diagram of a system (1000) for handling a UE (100) with CAG subscription in a wireless network according to various embodiments of the present disclosure. In an embodiment, the system (1000) includes the UE (100), a first network device (200), and a second network device (300). Throughout this disclosure, the terms "first network device" and "AMF" are used interchangeably and means the same. Throughout this disclosure, the terms "second network device" and "UDM" are used interchangeably and means the same. Examples of the UE (100) includes, but not limited to a smart phone, a tablet computer, a personal digital assistance (PDA), a desktop computer, an Internet of Things (IoT), etc. In an embodiment, the UE (100) includes a CAG subscription controller (110), a memory (120), a processor (130), and a communicator (140). In an embodiment, the first network device (200) includes a CAG subscription controller (210), a memory (220), a processor (230), and a communicator (240). In an embodiment, the first network device (200) includes a CAG subscription controller (310), a memory (320), a processor (330), and a communicator (340).

The memory (120), (220), and (320) may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM). In addition, the memory (120), (220), and (320) may, in some examples, be considered a non-transitory storage medium. The term "non-transitory" may indicate that the storage medium is not embodied in a carrier wave or a propagated signal. However, the term "non-transitory" should not be interpreted that the memory (120), (220), and (320) is non-movable. In some examples, the memory (120), (220), and (320) can be configured to store larger amounts of information than its storage space. In certain examples, a non-transitory storage medium may store data that can, over time, change (e.g., in Random Access Memory (RAM) or cache).

The processor (130), (230), and (330) is configured to execute instructions stored in the memory (120), (220), and (320) respectively. The processor (130), (230), and (330) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130), (230), and (330) may include multiple cores to execute the instructions. The communicator (140), (240), and (340) is configured to communicate internally between hardware components in the UE (100), the first network device (200), and the second network device (300) respectively. Further, the communicator (140), (240), and (340) is configured to facilitate the communication with other devices. The communicator (140), (240), and (340) includes an electronic circuit specific to a standard that enables wired or wireless communication. The communicator (140), (240), and (340) can be a transceiver respectively.

The CAG subscription controller (110), (210), and (310) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the UE is configured to send a registration request to the first network device (200) as a part of a registration procedure. The first network device (200) is configured for receiving the registration request from the UE (100). The first network device (200) is configured for sending the first message to the second network device (300). The first message indicates a request to register with the second network device (300) on behalf of the UE (100), and whether the first network device (200) supports CAG feature. The second network device (300) is configured for determining whether the first network device (200) supports the CAG feature based on the indication. The second network device (300) is configured for determining that the UE (100) has the CAG subscription based on CAG subscription data, where the second network device (300) has a database where subscription data of all UEs are stored. The second network device (300) is configured for rejecting the registration of the LUE (100) to first network device (200), in response to determining that the first network device (200) does not support the CAG feature and the UE (100) has the CAG subscription. The second network device (300) is configured for sending the second message indicating the rejection of the registration of the UE (100) to the first network device (200). The first network device (200) is configured for sending registration reject message with a NAS cause value to the UE (100), in response to receiving the second message. Further, the IE (100) is configured for terminating an access to the first network device (200) based on the NAS cause value, in response to receiving the registration reject message. The NAS cause value includes one of #3 (illegal LUE), #6 (Illegal ME), #7 (5GS services not allowed), #11 (PLMN not allowed), #12 (Tracking area not allowed), #13 (Roaming not allowed in this tracking area), #15 (No suitable cells in tracking area), #27 (N1 mode not allowed), #62 (No network slices available), and #76 (Not authorized for this CAG or authorized for CAG cells only).

In another embodiment, the second network device (300) is configured for detecting the change in the subscription of the UE (100) with respect to a CAG subscription data, where the UE (100) is registered to the second network device (300) through the first network device (200). The second network device (300) is configured for determining whether the first network device (200) supports the CAG feature. The second network device (300) is configured for sending a message request to the first network device (200) for initiating a deregistration of the UE(100), in response to determining that the first network device (200) does not support the CAG feature and the UE (100) has the CAG subscription. The first network device (200) is configured for sending a deregistration request message with the NAS cause value to the UTE (100), in response to receiving the message request. Further, the IE (100) is configured for initiating the deregistration of the UE (100) at the first network device (200) based on the NAS cause value, in response to receiving the deregistration request message.

Although the FIG. 1 shows the hardware components of the system (1000) but it is to be understood that other embodiments are not limited thereon. In other embodiments, the system (1000) may include less or more number of components. Further, the labels or names of the components are used only for illustrative purpose and does not limit the scope of the invention. One or more components can be combined together to perform same or substantially similar function for handling the UE (100) with the CAG subscription.

Figure 2:
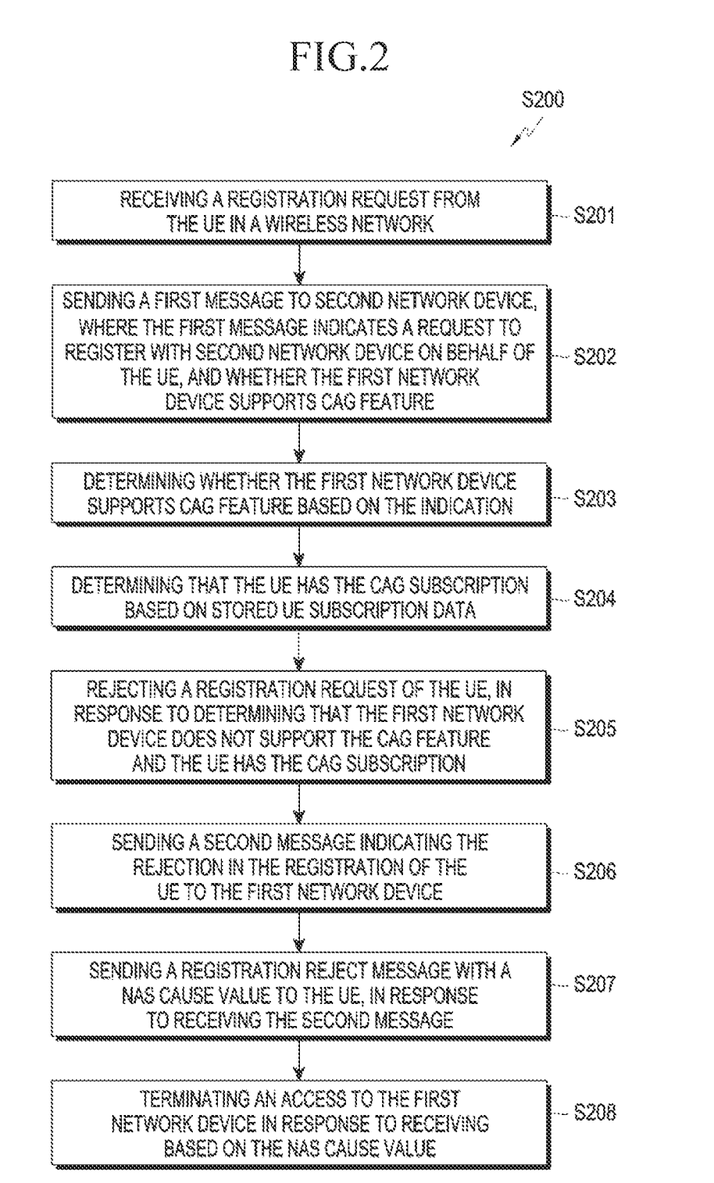
FIG. 2 illustrates a flow diagram illustrating a method for handling the UE with the CAG subscription in response to receiving a registration request from the UE according to various embodiments of the present disclosure.

FIG. 2 illustrates a flow diagram S200 illustrating a method for handling the IE (100) with the CAG subscription in response to receiving the registration request from the UE (100) according to various embodiments of the present disclosure. At step S201, the method includes receiving the registration request from the UE (100). In an embodiment, the method allows the CAG subscription controller (210) to receive the registration request from the UE (100). At step S202, the method includes sending the first message to the second network device (300), where the first message indicates the request to register with the second network device (300) on behalf of the UE (100), and whether the first network device (200) supports the CAG feature. In an embodiment, the method allows the CAG subscription controller (210) to send the first message to the second network device (300).

At step S203, the method includes determining whether the first network device (200) supports the CAG feature based on the indication. In an embodiment, the method allows the CAG subscription controller (310) for determining whether the first network device (200) supports the CAG feature based on the indication. At step S204, the method includes determining that the UE (100) has the CAG subscription based on the CAG subscription data. In an embodiment, the method allows the CAG subscription controller (310) to determine that the UE (100) has the CAG subscription based on the CAG subscription data. At step S205, the method includes rejecting the registration request of the UE (100) to first network device (200), in response to determining that the first network device (200) does not support the CAG feature and the UE (100) has the CAG subscription. In an embodiment, the method allows the CAG subscription controller (310) to reject the registration request of the UE (100) to first network device (200), in response to determining that the first network device (200) does not support the CAG feature and the UE (100) has the CAG subscription.

At step S206, the method includes sending the second message indicating the rejection of the registration of the UE (100) to the first network device (200). In an embodiment, the method allows the CAG subscription controller (310) to send the second message indicating the rejection of the registration of the UE (100) to the first network device (200). At step S207, the method includes sending the registration reject message with the NAS cause value to the UE (100), in response to receiving the second message. In an embodiment, the method allows the CAG subscription controller (210) to send the registration reject message with the NAS cause value to the UE (100), in response to receiving the second message. At step S208, the method includes terminating the access to the first network device (200) based on the NAS cause value, in response to receiving the registration reject message. In an embodiment, the method allows the CAG subscription controller (110) to terminate the access to the first network device (200) based on the NAS cause value, in response to receiving the registration reject message.

Figure 3:
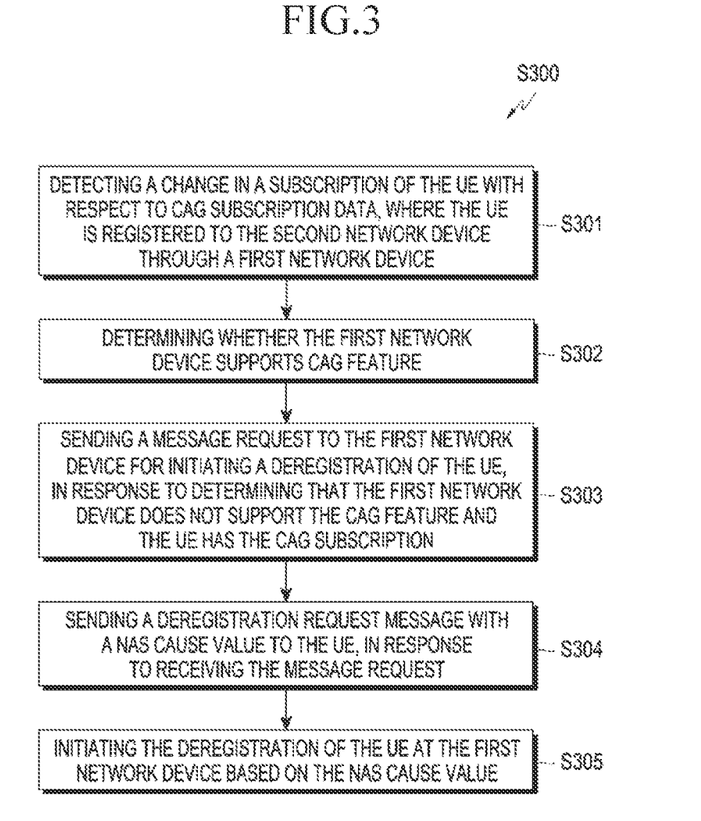
FIG. 3 illustrates a flow diagram illustrating a method for handling the UE with the CAG subscription in response to detecting a change in a subscription of the UE.

FIG. 3 illustrates a flow diagram S300 illustrating a method for handling the UE (100) with the CAG subscription in response to detecting the change in the subscription of the UE (100) according to various embodiments of the present disclosure. At step S301, the method includes detecting the change in the subscription of the UE (100) with respect to the CAG subscription data, where the UE (100) is registered to the second network device (300) through the first network device (200). In an embodiment, the method allows the GAG subscription controller (310) to detect the change in the subscription of the UE (100) with respect to the CAG subscription data, where the UE (100) is registered to the second network device (300) through the first network device (200).

At step S302, the method includes determining whether the first network device (200) supports the CAG feature. In an embodiment, the method allows the CAG subscription controller (310) to determine whether the first network device (200) supports the CAG feature. At step S303, the method includes sending the message request to the first network device (200) for initiating the deregistration of the UE (100), in response to determining that the first network device (200) does not support the CAG feature and the UE (100) has the CAG subscription. In an embodiment, the method allows the CAG subscription controller (310) to send the message request to the first network device (200) for initiating the deregistration of the UE (100), in response to determining that the first network device (200) does not support the GAG feature and the UE (100) has the CAG subscription.

At step S304, the method includes sending the deregistration request message with the NTAS cause value to the UE (100), in response to receiving the message request. In an embodiment, the method allows the CAG subscription controller (210) to send the deregistration request message with the NAS cause value to the UE (100), in response to receiving the message request. At step S305, the method includes initiating the deregistration of the UE (100) at the first network device (200) based on the NAS cause value, in response to receiving the deregistration request message. In an embodiment, the method allows the GAG subscription controller (110) to initiate the deregistration of the UE (100) at the first network device (200) based on the NAS cause value, in response to receiving the deregistration request message.

The various actions, acts, blocks, steps, or the like in the flow diagrams S200 and S300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
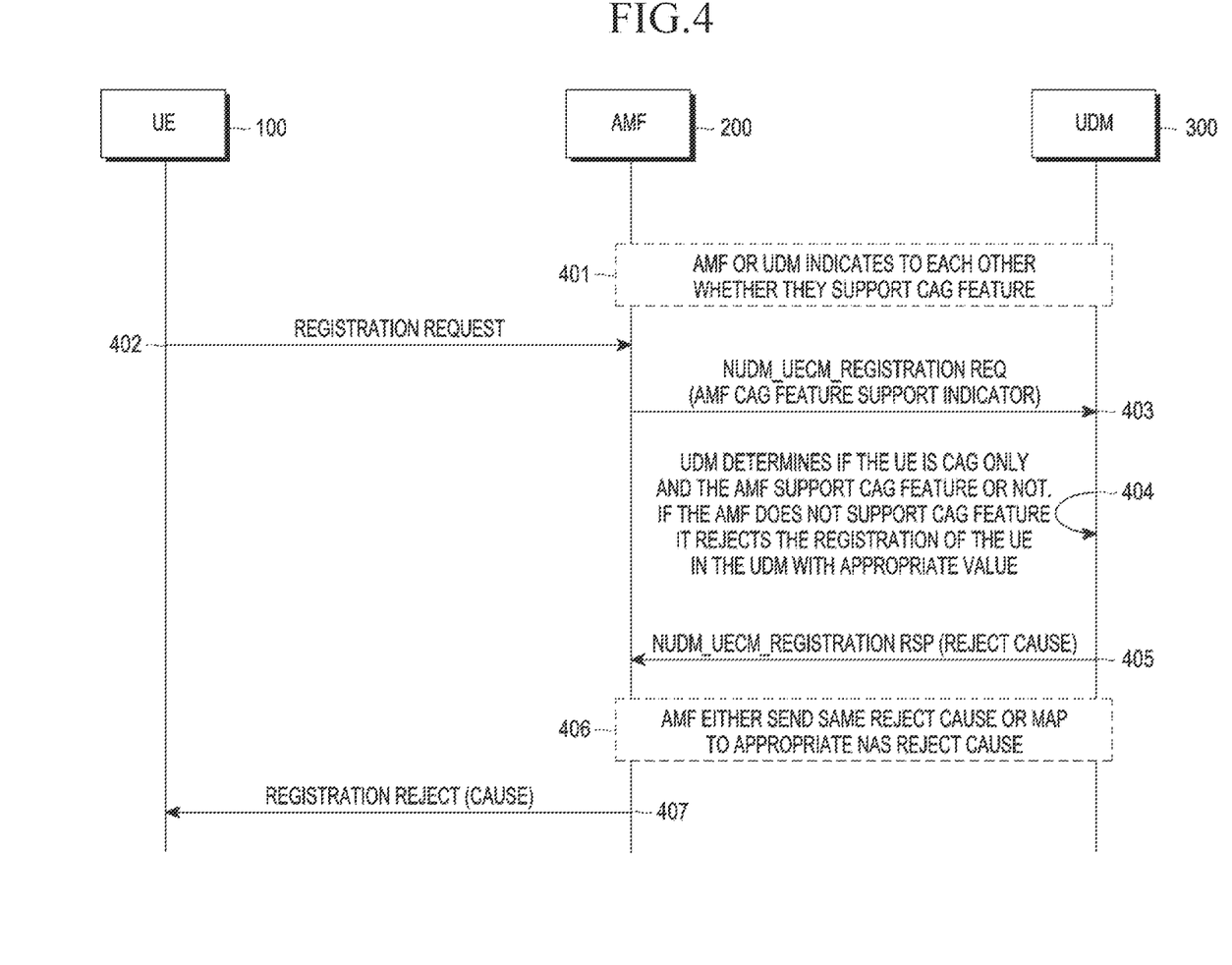
FIG. 4 illustrates a sequential diagram illustrating signaling between the UE, a AMF, and a UDM for handling the UE with the CAG subscription in response to receiving the registration request from the UTE according to various embodiments of the present disclosure.

FIG. 4 illustrates a sequential diagram illustrating signaling between the UE (100), the AMF (200) (i.e. the first network device), and the UDM (300) (i.e. the second network device) for handling the UE (100) with the CAG subscription in response to receiving the registration request from the UE (100) according to various embodiments of the present disclosure. Optionally at step 401, the AMF (200) indicates to the UDM (300) whether the AMF (200) supports the CAG feature, and the UDM (300) indicates to AMF (200) whether the UDM (300) support the CAG feature.

Consider an example scenario that a user has inserted a Universal Subscriber Identity Module (USIM) that has subscription to access 5GS via a CAG cell, in the UE (100) which does not have a CAG configuration related to the USIM. Consider another example scenario that the UE (100) with an embedded USIM without the CAG configuration related to the embedded USIM. At step 402, the UE (100) selects a normal cell and initiates the registration procedure to a PLMN by sending the registration request message to the AMF (200) of the normal cell. Upon receiving the registration request message the AMF (200) registers the UE (100) to the UDM (300) by sending the first message (i.e. Nudm_UECM_Registration REQ) to the UDM (300). In the first message the AMF (200) sends an Information Element (IE) (i.e. AMF CAG feature support indicator) indicating whether the AMF (200) supports the CAG feature or not. If the IE is not present in the first message then the UDM (300) determines that the AMF (200) does not support the CAG feature.

At step 404, upon receiving the first message, the UDM (300) determines that the AMF (200) does not support the CAG feature based on a presence and value of the IE. When the UDM (300) determines that the AMF (200) does not support the CAG feature, and the UE (100) is allowed to access the 5GS of PLMN via CAG cell(s) only as per the subscription, then the UDM (300) rejects the registration procedure and sends the second message (i.e. Nudm_UECM_Registration Rsp) to the AMF (200) indicating the registration rejects due to no subscription (e.g. forbidden area) at step 405. Upon receiving the second message, the AMF (200) rejects the registration procedure and sends the registration reject message with one of the 5GMM NAS cause value given in table 1:

TABLE 1

| 5GMM NAS cause | Definition of the 5GMM NAS cause |
| --- | --- |
| #3 | Illegal UE |
| #6 | Illegal ME |
| #7 | 5GS services not allowed |
| #11 | PLMN not allowed |
| #12 | Tracking area not allowed |
| #13 | Roaming not allowed in this tracking area |
| #15 | No suitable cells in tracking area |
| #27 | N1 mode not allowed |
| #62 | No network slices available |
| #76 | Not authorized for this CAG or authorized for CAG cells only |

Optionally at step 406, upon receiving the second message, the AMF (200) rejects the registration procedure and sends either same reject cause or map to appropriate NAS reject cause. Upon receiving the registration reject message at step 407, the UE (100) takes action as per the received 5GMM reject cause in the registration reject message. An AMF (200) connected to the NG-RAN indicates to the NC-RAN that it supports the CAG feature during an existing New Generation Application Protocol (NG-AP) procedure or a new NG-AP procedure by including the CAG feature support indicator in a NG-AP message. Similarly, the NG-RAN may also indicate to the AMF (200) regarding the CAG feature support of the NG-RAN. When the NG-RAN receives a Radio Resource Control (RRC) message containing a NAS message from a CAG cell for the UE (100), then the NG-RAN selects an AMF (200) supporting the CAG feature and forwards the NAS message to the selected AMF (200). Upon reception of the NAS message, the AMF (200) processes the NAS message.

In another embodiment, the AMF (200) is connected to the NG-RAN and indicates that the AMF (200) supports the CAG feature during the existing NG-AP procedure (e.g. during NG setup procedure in NG SETUP RESPONSE) or the new NG-AP procedure by including the CAG feature support indicator in the NG-AP message. Similarly, the NC-RAN may also indicate to the AMF (200). When the NG-RAN receives the RRC message containing the NAS message from the CAG cell for the UE (100), the NG-RAN selects the AMF (200) supporting the CAG feature and forwards the NAS message to the selected AMF (200). Upon reception of the NAS message, the AMF (200) processes the NAS message.

Figure 5:
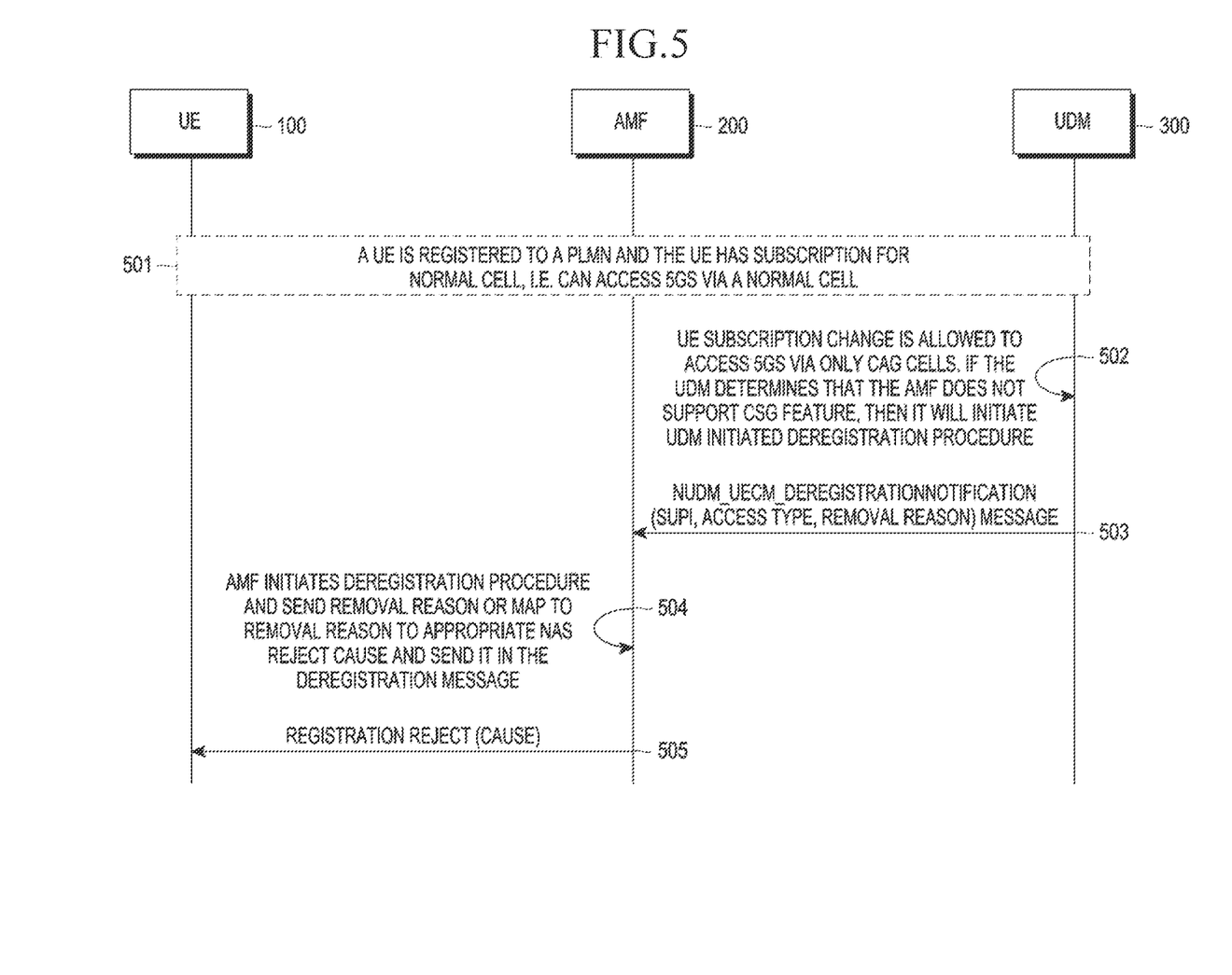
FIG. 5 illustrates a sequential diagram illustrating signaling between the UE, the AMF, and the UDM for handling the UE with the CAG subscription in response to detecting the change in the subscription of the UE according to various embodiments of the present disclosure.

FIG. 5 illustrates a sequential diagram illustrating signaling between the UE (100) (100), the AMF (200) (i.e. the first network device), and the UDM (300) (i.e. the second network device) for handling the UE (100) with the CAG subscription in response to detecting the change in the subscription of the LUE (100) according to various embodiments of the present disclosure. At step 501, the UE (100) is registered to the PLMN and the UE (100) has the subscription for the normal cell i.e. can access 5GS via the normal cell. Consider, the subscription of the UE (100) is changed and allowed to access the 5GS via only CAG cell(s). At step 502, if the UDM (300) determines that the AMF (200) does not support the CAG feature, then the UDM (300) initiates a deregistration procedure by sending the message request (i.e. Nudm_UECM_DeregistrationNotification message (e.g. Subscription Permanent Identifier (SUPI), access type, removal reason)) to the AMF (200).

If the UE (100) is connected over a 3GPP access and a non-3GPP access, then the UE (100) initiates the deregistration procedure for both the access. In case of a dual registration procedure, the UDM (300) or Home Subscriber Server (HSS) initiates the deregistration in a Evolved Packet System (EPS) also i.e. to Mobility Management Entity (MME). The MME will then initiates the deregistration procedure. In one example the UDM (300) initiates a single deregistration procedure if the IE (100) is connected via the 3GPP access and the non-3GPI access via the same AMF (200). In this case, the AMF (200) initiates a combined deregistration procedure for both the 3GPP access or the non-3GPP access or a separate de-registration procedure.

At step 503, when the AMY (200) receives the Nudm_UEC_Deregistration Notification message, then the AMF (200) initiates the deregistration procedure. At step 504, the AMF (200) initiates the deregistration procedure by sending the deregistration Request message including the 5GMM NAS cause value as given in the table 1, where the NAS cause value is set to a removal reason or the removal reason maps to an existing NAS cause value.

At step 505, upon reception of the deregistration request message the UE (100) deregisters from the wireless network and further operate as per the received NAS cause value. The UE (100) and the UDM (300) follow the same logic as described for the registration procedure to update a CAG information list during a service request procedure or generic UE configuration update procedure.

In one embodiment, the UE (100) supports the dual registration mode and is registered to both the 5GS and the EPS of the PLMN. Further, the UE subscription is changed to the CAG only subscription for the PLMN, i.e. the UE (100) is allowed to access the 5GS via the CAG cell(s) only. Then the network sends this information to the UE (100) in a NAS message (e.g. registration accept/registration reject/service accept or service reject or UE configuration update command). Upon reception of the NAS message, the UE (100) performs the deregistration procedure for the 5GS. The UE (100) either detaches for the EPS locally or initiates a UE initiated detach procedure. The UE (100) further sends a detach type power off in a detach request message. Upon reception of the detach request message, the LUE (100) performs the de-registration procedure for the 5GS over one access. Upon reception of the detach request message and if the UE (100) is registered to the 5GS over another access, then the UE (100) performs a local deregistration procedure or an explicit deregistration procedure over another access by initiating the UE initiated detach procedure.

In another embodiment, a CAG subscription information list is sent from the UDM (300) to the AMF (200). Further, the AMF (200) forwards the CAG subscription information list to the UE (100) during the registration procedure or a generic UE configuration update procedure. The CAG information list contains an allowed CAG list per PLMN and also an indication of whether the IE (100) is allowed to access the 5GS via the CAG cell only per the PLMN. The CAG information list is transmitted to the UE (100) via the PLMN/virtual PLMN (VPLMN) to which the UE (100) is registered. A rogue VPLMN might change a content of the CAG information list in a way that the UE (100) never camps on the CAG cell of higher priority VPLMN or influence the IE (100) to camp to the rogue VPLMN always or anything that puts the rogue VPLMN in advantage. For example, the VPLMN removes the allowed CAG list of all other VPLMN. In this case, the UE (100) will never camp on the higher VPLMN.

In one example if the VPLMN sends an indication that the UE (100) is allowed to access the 5GS via the CAG only for a higher priority PLMN and removes the allowed CAG list of the higher priority PLMN, then the UE (100) will never camp on the high priority VPLMN. In this way, the VPLMN can influence to keep the UE (100) in its network. A manual CAG selection procedure allows the user to select a CAG Identifier (ID) not present in the allowed CAG list. Further, the UE (100) initiates the registration procedure on the CAG cell supporting the selected CAG ID. It is not clear how the PLMN controls the UE (100) to allow or not allow the manual selection procedure. A rogue UE may create a lot of signaling on the wireless network by initiating the manual CAG selection procedure.

In the above embodiment, AMF (200) or UDM (300) can be 3GPP Rel-16 or 3GPP Rel-15 compliant. The UDM (300) determines whether the AMF (200) is 3GPP Rel-16/Rel-15 complaint depending on the 3GPP Rei-15 or 3GPP Rel-16 indicator in a message from AMF (200) to the UDM (300). 3GPP Rel-15 AMF (200) does not support the CAG feature.

So, the UDM (300) can determine that the AMF (200) does not support the CAG if it is Rel-15 compliant.

Unlike to the conventional methods and systems, the proposed method provides the following steps:

1. A UE (100) is registered to a. Home PLMN (HPLMN) and the HPLMN sends an equivalent PLMN list to the UE (100). Further, the UE (100) stores the equivalent PLMN list.
2. The UE (100) selects the equivalent PLMN of the HPLMN. The UE (100) performs the registration procedure on the equivalent PLMN by sending the registration request message.
3. The UDM (300) determines that the UE (100) is in the equivalent PLMN, and sends a complete CAG information list (i.e. CAG subscriptions of all PLMN including the HPLMN) to the AMF (200). If the PLMN is not HPLMN or its equivalent PLMN, then the UDM (300) sends the CAG subscription related to the current VPLMN only instead of sending the complete CAG information list.
4. The AMF (200) forwards the CAG information list in the registration accept message.
5. The UE (100) stores the complete CAG information list. If the UE (100) is in a non-equivalent PLMN, then the UE (100) stores the CAG information list if the list contains the CAG subscription related to its PLMN. Otherwise, either the UE (100) ignores the message or only stores the CAG subscription related to its PLMN.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for handling a user equipment (UE) with a closed access group (CAG) subscription by a unified data management (UDM) in a wireless network, the method comprising:
   receiving, from an access and mobility management function (AMF), a request message for registering the UE to the UDM;
   transmitting, to the AMF, a reject message in response to the request message, if the AMF does not support a CAG feature and the UE is allowed to access a fifth generation system (5GS) via CAG cell only;
   transmitting, to the AMF, an accept message in response to the request message, if the AMF supports the CAG feature and the UE is allowed to access the 5GS via CAG cell only; and
   transmitting, to the AMF, a deregistration request message for deregistration of the UE, if the UE is registered to the AMF which does not support the CAG feature,
   wherein the deregistration request message includes information indicating reason of the deregistration, and information indicating an access type.

2. The method of claim 1, wherein the reject message indicates that the registration of the UE is rejected due to no subscription.

3. The method of claim 1, further comprising:
receiving, from the AMF, information indicating whether the AMF supports the CAG feature.

4. An apparatus of a unified data management (UDM) for handling a user equipment (UE) with a closed access group (CAG) subscription in a wireless network, the apparatus comprising:
a transceiver; and
at least one processor coupled to the transceiver, wherein the at least one processor is configured to:
receive, from an access and mobility management function (AMF), a request message for registering the UE to the UDM;
transmit, to the AMF, a reject message in response to the request message, if the AMF does not support a CAG feature and the UE is allowed to access a fifth generation system (5GS) via CAG cell only;
transmit, to the AMF, an accept message in response to the request message, if the AMF supports the CAG feature and the UE is allowed to access the 5GS via CAG cell only; and
transmit, to the AMF, a deregistration request message for deregistration of the UE, if the UE is registered to the AMF which does not support the CAG feature,
wherein the deregistration request message includes information indicating reason of the deregistration, and information indicating an access type.

5. The apparatus of claim 4, wherein the reject message indicates that the registration of the UE is rejected due to no subscription.

6. The apparatus of claim 4, wherein the at least one processor is further configured to:
receive, from the AMF, information indicating whether the AMF supports the CAG feature.

7. A method for handling a user equipment (UE) with a closed access group (CAG) subscription by an access and mobility management function (AMF) in a wireless network, the method comprising:
transmitting, to a unified data management (UDM), a request message for registering the UE to the UDM;
receiving, from the UDM, a reject message in response to the request message, if the AMF does not support a CAG feature and the UE is allowed to access a fifth generation system (5GS) via CAG cell only;
receiving, from the UDM, an accept message in response to the request message, if the AMF supports the CAG feature and the UE is allowed to access the 5GS via CAG cell only; and
receiving, from the UDM, a deregistration request message for deregistration of the UE, if the UE is registered to the AMF which does not support the CAG feature,
wherein the deregistration request message includes information indicating reason of the deregistration, and information indicating an access type.

8. The method of claim 7, further comprising:
transmitting a registration reject message with a non-access stratum (NAS) cause value to the UE, in response to receiving the reject message.

9. The method of claim 8, wherein if the reject message indicates that the registration of the UE is rejected due to no subscription, the NAS cause value comprises one of #11 (public land mobile network (PLMN) not allowed), #12 (Tracking area not allowed), and #13 (Roaming not allowed in this tracking area).

10. The method of claim 7, further comprising:
transmitting, to the UDM, information indicating whether the AMF supports the CAG feature.

11. An apparatus of an access and mobility management function (AMF) for handling a user equipment (UE) with a closed access group (CAG) subscription in a wireless network, the apparatus comprising:
a transceiver; and
at least one processor coupled to the transceiver, wherein the at least one processor is configured to:
transmit, to a unified data management (UDM), a request message for registering the UE to the UDM;
receive, from the UDM, a reject message in response to the request message, if the AMF does not support a CAG feature and the UE is allowed to access a fifth generation system (5GS) via CAG cell only;
receive, from the UDM, an accept message in response to the request message, if the AMF supports the CAG feature and the UE is allowed to access the 5GS via CAG cell only; and
receive, from the UDM, a deregistration request message for deregistration of the UE, if the UE is registered to the AMF which does not support the CAG feature,
wherein the deregistration request message includes information indicating reason of the deregistration, and information indicating an access type.

12. The apparatus of claim 11, wherein the at least one processor is further configured to:
transmit a registration reject message with a non-access stratum (NAS) cause value to the UE, in response to receiving the reject message.

13. The apparatus of claim 12, wherein if the reject message indicates that the registration of the UE is rejected due to no subscription, the NAS cause value comprises one of #11 (public land mobile network (PLMN) not allowed), #12 (Tracking area not allowed), and #13 (Roaming not allowed in this tracking area).

14. The apparatus of claim 11, wherein the at least one processor is further configured to:
transmit, to the UDM, information indicating whether the AMF supports the CAG feature.

* * * * *